United States Patent
Kaneko

(10) Patent No.: US 9,096,274 B2
(45) Date of Patent: Aug. 4, 2015

(54) FRONT STRUCTURE FOR VEHICLE

(75) Inventor: Tsuneaki Kaneko, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/235,498

(22) PCT Filed: Jul. 16, 2012

(86) PCT No.: PCT/IB2012/001384
§ 371 (c)(1),
(2), (4) Date: Jan. 28, 2014

(87) PCT Pub. No.: WO2013/021246
PCT Pub. Date: Feb. 14, 2013

(65) Prior Publication Data
US 2014/0152044 A1   Jun. 5, 2014

(30) Foreign Application Priority Data
Aug. 10, 2011   (JP) .................. 2011-174871

(51) Int. Cl.
B62D 25/14   (2006.01)
B62D 21/09   (2006.01)
B62D 25/08   (2006.01)

(52) U.S. Cl.
CPC .............. *B62D 25/145* (2013.01); *B62D 21/09* (2013.01); *B62D 25/081* (2013.01); *B62D 25/14* (2013.01)

(58) Field of Classification Search
CPC ...... B62D 25/08; B62D 25/081; B62D 25/14; B62D 27/023
See application file for complete search history.

(56) References Cited

U.S. PATENT DOCUMENTS

| | | | |
|---|---|---|---|
| 5,082,078 A | 1/1992 | Umeda et al. | |
| 5,120,106 A * | 6/1992 | Sakurai et al. | 296/193.02 |
| 6,250,710 B1 * | 6/2001 | Matsuzaki | 296/203.02 |
| 7,997,366 B2 * | 8/2011 | Tanaka | 180/68.3 |
| 8,702,148 B2 * | 4/2014 | Ichikawa | 296/70 |
| 2003/0107243 A1 * | 6/2003 | Hayashi | 296/192 |
| 2003/0201133 A1 * | 10/2003 | Kobayashi et al. | 180/291 |
| 2007/0102222 A1 | 5/2007 | Tanaka | |
| 2008/0111397 A1 * | 5/2008 | Yamada et al. | 296/193.09 |
| 2010/0301636 A1 * | 12/2010 | Yano | 296/192 |
| 2012/0032468 A1 * | 2/2012 | Shibutake et al. | 296/96.21 |
| 2012/0187711 A1 * | 7/2012 | Yamagishi | 296/72 |
| 2013/0093216 A1 * | 4/2013 | Naoi | 296/203.02 |
| 2013/0264843 A1 * | 10/2013 | Toba | 296/204 |
| 2014/0152054 A1 * | 6/2014 | Yano | 296/193.08 |

FOREIGN PATENT DOCUMENTS

| | | |
|---|---|---|
| EP | 0 426 107 A2 | 5/1991 |
| EP | 2 314 500 A2 | 4/2011 |
| JP | U-5-46668 | 6/1993 |

(Continued)

*Primary Examiner* — Glenn Dayoan
*Assistant Examiner* — Paul Chenevert
(74) *Attorney, Agent, or Firm* — Oliff PLC

(57) ABSTRACT

A front structure for a vehicle includes a cowl panel which has at least a front wall and a bottom wall and which opens toward a top of the vehicle, a dash panel which has an upper end portion which is joined to the front wall of the cowl panel in an overlapping relationship in a vehicle length direction, and a patch which has a lower end side which is joined to the dash panel and an upper end side which is joined to the bottom wall of the cowl panel to form a closed cross-section in conjunction with the dash panel and the bottom wall.

6 Claims, 6 Drawing Sheets

(56) References Cited

FOREIGN PATENT DOCUMENTS

| JP | 2004-130976 | | 4/2004 | | |
|----|-------------|---|--------|---|---|
| JP | 2005206109 | A * | 8/2005 | ............ | B62D 25/08 |
| JP | 2007-153314 | A | 6/2007 | | |
| JP | 2008-168687 | | 7/2008 | | |
| JP | 2009-113568 | | 5/2009 | | |
| JP | 2009-137380 | | 6/2009 | | |

* cited by examiner

FRONT STRUCTURE FOR VEHICLE

The disclosure of Japanese Patent Applications No. 2011-174871 filed on Aug. 10, 2011, including the specification, drawings and abstract is incorporated herein by reference in its entirety.

BACKGROUND OF THE INVENTION

1. Field of the Invention

The present invention relates to a front structure for a vehicle in which a dash panel and a cowl are joined together.

2. Description of Related Art

A configuration is known in which a first reinforcement that is arranged along the entire length of a cowl rear wall and a dash panel which is joined to the cowl front wall are coupled by a second reinforcement at the center in a vehicle width direction (refer to Japanese Utility Model Application Publication No. 5-46668 (JP 5-46668 U), for example). A structure which includes a brace that has one end which is joined to a cowl rear wall and the other end which is joined to a pair of patches which are secured to a dash panel at both sides, in a vehicle width direction, of an opening of the dash panel which is joined to a cowl front wall is known (refer to Japanese Patent Application Publication No. 2009-113568 (JP 2009-113568 A), for example). In addition, a front structure for an automobile body is known which includes a brace that couples the back side of a dash panel which is joined to a cowl bottom wall in a vertically overlapping relationship and a cowl rear wall at the center in a vehicle width direction (refer to Japanese Patent Application Publication No. 2004-130976 (JP 2004-130976 A), for example).

Because the junction where a dash panel and a cowl are joined in an overlapping relationship in a vehicle length direction undergoes deformation which tends to cause separation thereof by a force from a wheel, there is a room for improvement in terms of improvement of the strength against separation of the junction between the dash panel and cowl.

SUMMARY OF THE INVENTION

In view of the above problem, the present invention provides a front structure for a vehicle which can improve the strength against separation of the junction where a dash panel and a cowl are joined in an overlapping relationship in a vehicle length direction.

According to one aspect of the present invention, a front structure for vehicle is provided which includes: a cowl panel which has at least a front wall and a bottom wall that extends from a lower end of the front wall toward a rear of the vehicle and which opens toward a top of the vehicle; a dash panel which has an upper end portion which is joined to the front wall of the cowl panel in an overlapping relationship in a vehicle length direction; and a reinforcing member which has a lower end side which is joined to the dash panel at a junction and an upper end side which is joined to the bottom wall of the cowl panel to form a closed cross-section in conjunction with the dash panel and the bottom wall.

According to the front structure for a vehicle as described above, the reinforcing member connects the dash panel and the bottom wall of the cowl panel across the junction where the front wall of the cowl panel and upper end side of the dash panel are joined in an overlapping relationship in a vehicle length direction. In addition, the dash panel, the bottom wall and the reinforcing member form a closed cross-section as seen in a side view. In this configuration, a load which tends to cause separation of the junction where the dash panel and the cowl panel are overlapped in a vehicle length direction is restricted by tension of the reinforcing member. This prevents the junction from undergoing deformation which tends to cause separation thereof.

As described above, the front structure for a vehicle as described above can improve the strength against separation of the junction where the dash panel and the cowl panel are overlapped in a vehicle length direction. Especially, because the reinforcing member is provided at a location in a vehicle width direction where the strength against separation would be relatively low without the reinforcing member, the strength against separation of the junction between the dash panel and the cowl panel can be efficiently improved compared to the case where a reinforcing member which extends in a wide range in a vehicle width direction is provided.

In the front structure for a vehicle, the dash panel may have a pair of folded portions that are formed apart from each other in a vehicle width direction, and the junction between the lower end side of the reinforcing member and the dash panel may include a plurality of main junctions that are located between the pair of folded portions of the dash panel.

In a front structure for a vehicle as described above, the folded portions of the dash panel serve as high-rigidity portions and tend to transmit a force from a wheel to the junction with the cowl panel. In other words, a portion of the dash panel above the region between the pair of folded portions would have a relatively low strength against separation (tend to undergo stress concentration) without the reinforcing member. Because the lower end side of the reinforcing member is joined to the dash panel at the main junctions, which are located between the pair of folded portions, the reinforcing member, which is disposed locally in a vehicle width direction, can improve the strength against separation of the junction between the dash panel and the cowl panel. In addition, because the reinforcing member has a plurality of main junctions, the stress that is generated at the junction between the reinforcing member and the dash panel is reduced compared to a configuration with only one main junction.

In a front structure for a vehicle as described above, the junction between the lower end side of the reinforcing member and the dash panel may include at least two subsidiary junctions, the pair of folded portions of the dash panel being sandwiched between the subsidiary junctions in a vehicle width direction.

In a front structure for a vehicle as described above, since the pair of folded portion are sandwiched between the at least two subsidiary junctions in a vehicle width direction, the subsidiary junctions help to prevent misalignment of the reinforcing member relative to the dash panel before joining of the main junctions. Thus, the main junctions can be properly joined at desired locations relative to the dash panel. This enables the main junctions to contribute to the improvement of the strength against separation of the junction between the dash panel and the cowl panel.

In a front structure for a vehicle as described above, the subsidiary junctions may be formed on a pair of leg portions that extend from a lower end side of the reinforcing member in opposite directions along a vehicle width direction.

In a front structure for a vehicle as described above, because the subsidiary junctions are formed on leg portions which extend from a lower portion of the reinforcing member, the subsidiary junctions can be located on both sides of a surface between the pair of folded portions without increasing the size of the reinforcing member.

In a front structure for a vehicle as described above, the upper end side of the reinforcing member may be joined to the bottom wall of the cowl panel at a plurality of points.

In a front structure for a vehicle as described above, because the reinforcing member is joined to the bottom wall of the cowl panel at a plurality of points, the stress that is generated at the junction between the reinforcing member and the cowl panel can be reduced compared to a configuration in which the bottom wall of the cowl panel is joined at only one point.

In a front structure for a vehicle as described above, the reinforcing member may have a main body portion which forms a closed cross-section in conjunction with the dash panel and the bottom wall of the cowl panel and which has a first edge that linearly extends along a first end side thereof in a vehicle width direction between the dash panel and the bottom wall and a second edge that extends in an arcuate configuration as seen in a side view along a second end side thereof in a vehicle width direction between the dash panel and the bottom wall; and a reinforcing wall which protrudes in a vehicle length direction from the second edge.

In a front structure for a vehicle as described above, the reinforcing member has a first edge that extends between the dash panel and the bottom wall of the cowl panel linearly and a second edge that extends between the dash panel and the bottom wall of the cowl panel in an arcuate configuration (to be convex either forward or rearward) as seen in a side view. Thus, the distance from the reinforcing member to the dash panel and the cowl panel is greater or smaller on the second edge side than on the first edge side. The reinforcing member can therefore be prevented from interfering with other components. The second edge, which has an arcuate configuration, may be disadvantageous in terms of strength against tension, but is reinforced against tension by the reinforcing wall, which protrudes from the second edge in a vehicle length direction. Thus, the second edge can help the reinforcing member to exhibit a desired reinforcing effect.

In a front structure for a vehicle as described above, the reinforcing member may include a main body portion which forms a closed cross-section in conjunction with the dash panel and the bottom wall of the cowl panel; a lower flange which is bent at a lower end of the main body portion and which extends along a back side of the dash panel and is joined to the dash panel; an upper flange that is bent at an upper end of the main body portion and which extends along a lower face of the bottom wall and is joined to the bottom wall; a lower restricting portion that restricts deformation which tends to increase a bend angle between the main body portion and the lower flange; and an upper restricting portion that restricts deformation which tends to increase a bend angle between the main body portion and the upper flange.

In a front structure for a vehicle as described above, a bend is formed between the main body portion and the upper flange and between the main body portion and the lower flange of the reinforcing member, and the reinforcing member undergoes deformation which tends to increase the bend angles of the bends (to unfold the bends) when a tensile load is applied to the reinforcing member. The reinforcing member has an upper restricting portion between the main body portion and the upper flange and a lower restricting portion between the main body portion and the lower flange. Thus, deformation which tends to unfold the upper and lower bends of the reinforcing member is restricted (limited), and the reinforcing member can effectively resist separation of the junction between the dash panel and the cowl panel by tension.

In a front structure for a vehicle as described above, the main body portion of the reinforcing member, which forms a closed cross-section in conjunction with the dash panel and the cowl panel, may have a plurality of openings.

In a front structure for a vehicle as described above, the main body portion of the reinforcing member has a plurality of openings that can be used to maintain the reinforcing member in a desired position. In other words, the reinforcing member can be joined to the dash panel and the cowl panel in an appropriate position relative to the dash panel and the cowl panel. Thus, the main junctions can be properly joined in a desired position relative to the dash panel. This enables the main junctions to contribute to the improvement of the strength against separation of the junction between the dash panel and the cowl panel.

As described in the foregoing, the front structure for a vehicle of the present invention is highly effective in improving the strength against separation of the junction where the dash panel and the cowl panel are overlapped in a vehicle length direction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
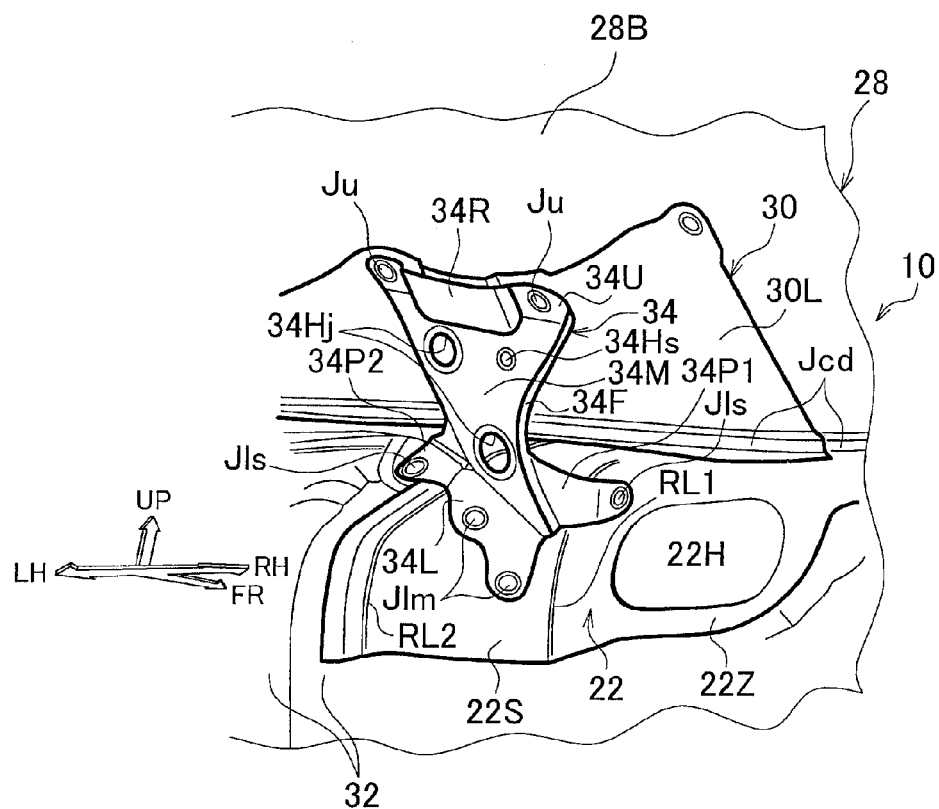
FIG. 1 is a perspective view of an essential part of a vehicle body front structure according to an embodiment of the present invention as seen from the rear of a vehicle.

Description is hereinafter made of a vehicle body front structure 10 as a front structure for a vehicle according to a first embodiment of the present invention with reference to FIG. 1 to FIGS. 6A and 6B. The arrow FR, the arrow UP, the arrow RH and the arrow LH, which are shown as needed in the drawings, indicates the forward (traveling) direction along the vehicle length direction, the upward direction along the vehicle height direction, the right side with respect to the traveling direction (one side with respect to a vehicle width direction), and the left side with respect to the traveling direction (the other side with respect to a vehicle width direction), respectively. In the following description, the terms "front" and "rear," "upper" and "lower," and "right" and "left" refer to the front and rear sides in the vehicle length direction, the upper and lower sides in the vehicle height direction, and the right and left sides with respect to the traveling direction of the vehicle, respectively, unless otherwise noted.

Figure 3:
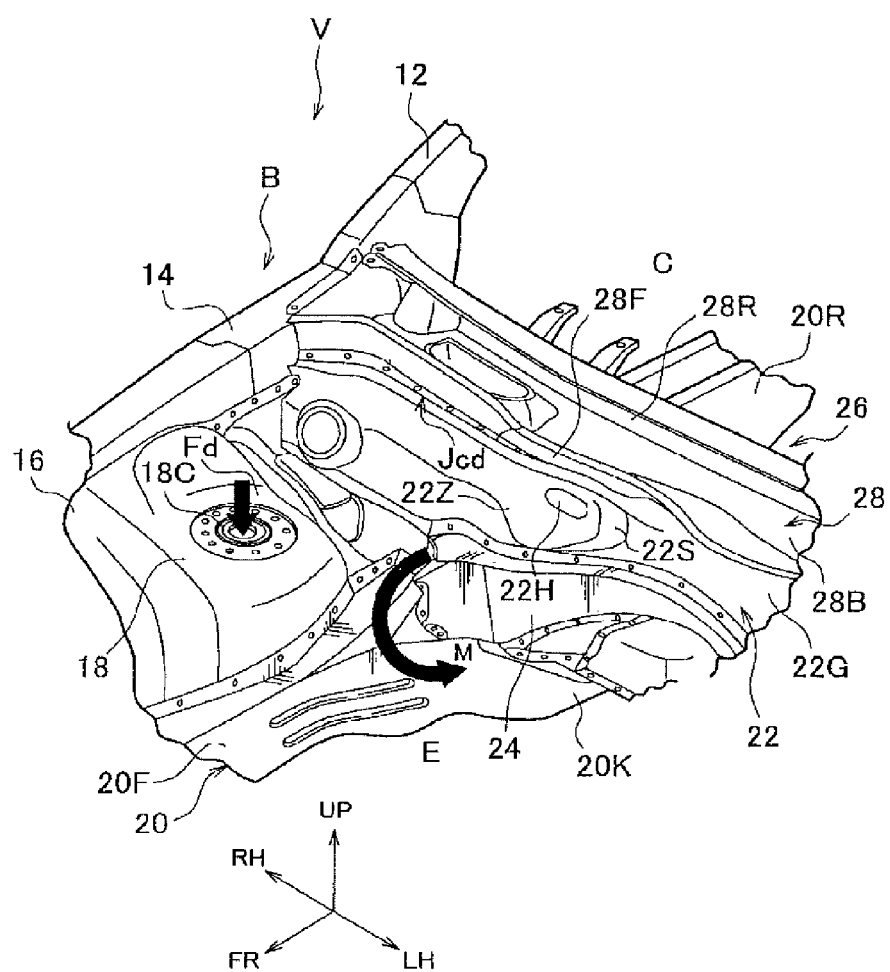
FIG. 3 is a perspective view of a front right part of an automobile to which a front structure for a vehicle according to the embodiment of the present invention is applied as seen from the front of the vehicle.

FIG. 3 is a perspective view that illustrates a part of the right side of a vehicle body B of an automobile V to which the vehicle body front structure 10 is applied. Because the vehicle body B is basically formed in a generally bilaterally symmetric fashion except the parts that are described later, the right side (the passenger side in this embodiment) of the vehicle body B is primarily described in the following description. As shown in FIG. 3, the, vehicle body B includes a front pillar 12, an apron upper member 14 that extends forward from a vertical intermediate portion of the front pillar 12, and an apron panel 16 that extends downward from the apron upper member 14. A front suspension tower 18 to which an upper end of a front suspension (not shown) is coupled is integrally formed with the apron panel 16, which constitutes the vehicle body B.

The vehicle body B also includes a front side member 20 as a skeletal member (such as a vehicle frame member) which extends in a vehicle length direction. One end side of a bumper reinforcement in a vehicle width direction is coupled to a front end (not shown) of the front side member 20. The front side member 20 includes a front portion 20F that extends in a vehicle length direction in an engine room E, a kick portion 20K which is curved along a dash panel 22, which is described later, and a rear portion 20R which forms a skeleton (such as a vehicle frame) that is elongated in a vehicle length direction in conjunction with a floor panel (not shown) behind the kick portion 20K. The front portion 20F of the front side member 20 has a rear portion which is joined to an inner portion of the front suspension tower 18 in a vehicle width direction.

The vehicle body B also includes a dash panel 22 which separates the engine room E and a cabin C. The dash panel 22 has a lower end side which is joined to a front end of a floor panel (not shown) along the almost entire length thereof in a vehicle width direction. A dash cross member 24 which forms a skeletal structure (such as a vehicle frame structure) with a closed cross-section in conjunction with the dash panel 22 is joined to a front side of the dash panel 22 along the almost entire length thereof in a vehicle width direction. The front portion 20F of the front side member 20 has a rear end which is joined in an abutting relationship with the dash cross member 24. The kick portion 20K of the front side member 20 is joined to a front face of the dash panel 22 and continues to the rear portion 20R, which is joined to a lower face of the floor panel.

The dash panel 22 has an upper end side to which a cowl panel 28 that constitutes a cowl member 26 is joined. The cowl panel 28, which is a member that has an inverted hat-like cross-section that opens upward and is elongated in a vehicle width direction, extends between vertical intermediate portions of right and left front pillars 12. The cowl panel 28 has longitudinal ends which are joined to a corresponding one of right and left apron upper members 14. The cowl member 26 including the cowl panel 28 is configured to support a windshield glass in conjunction with the right and left front pillars 12 and a roof head member (not shown).

In the vehicle body B as described above, the load from a front wheel (front suspension) is transmitted to the junction between the dash panel 22 and the cowl panel 28 as a load which tends to cause separation thereof via the front suspension tower 18 and the front pillar 12. The transmission of load is described later in connection with the effects of this embodiment.

The essential features of the vehicle body front structure 10 are described in detail below.

Figure 2:
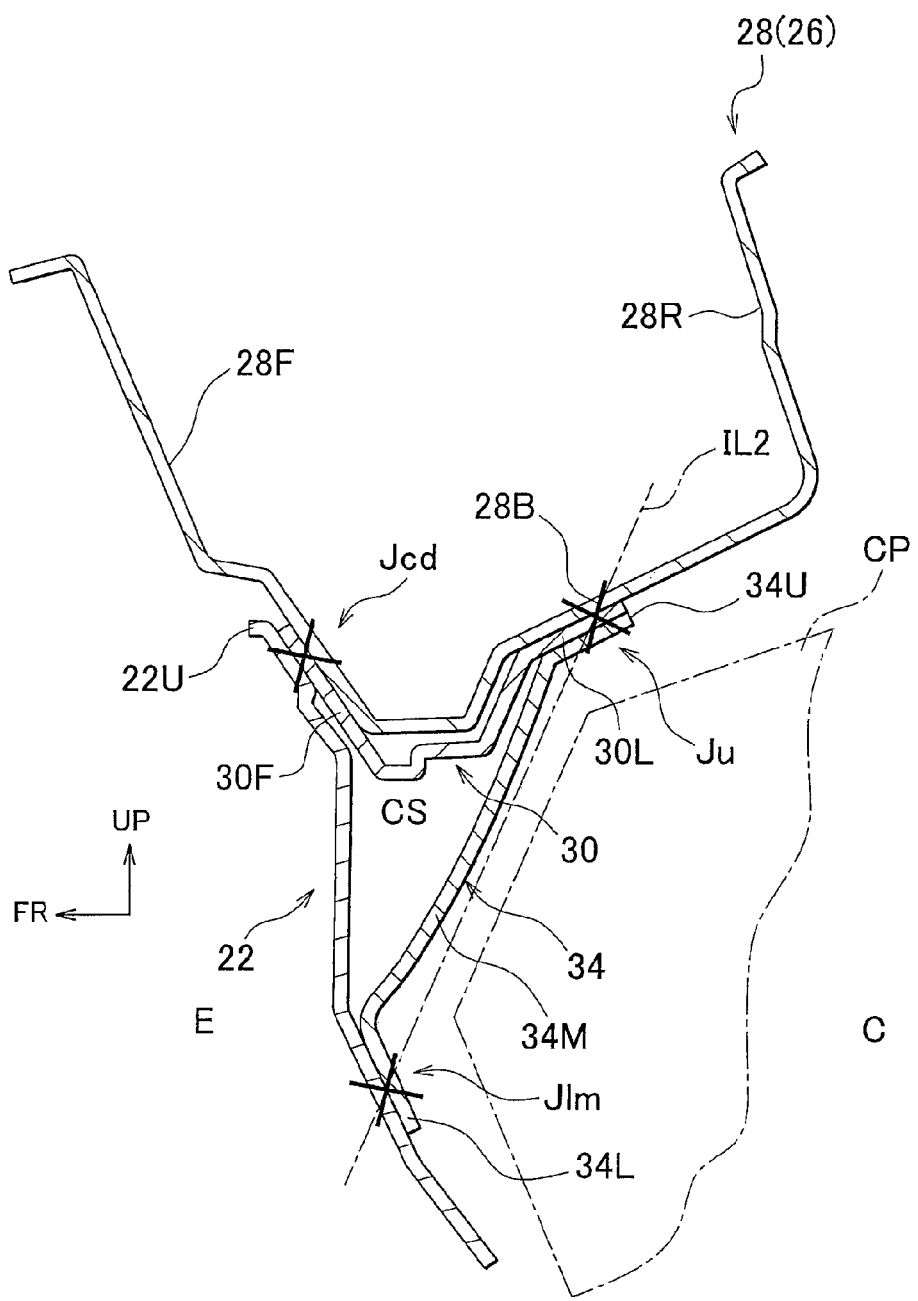
FIG. 2 is a sectional side elevation that illustrates an essential part of the vehicle body front structure according to the embodiment of the present invention.

As shown in FIG. 2, the cowl panel 28 includes, as essential components, a front wall 28F and a rear wall 28R which are opposed to each other in a vehicle length direction, and a bottom wall 28B which connects lower ends of the front wall 28F and the rear wall 28R. Thus, the cowl panel 28 opens upward as described above. At a lower front part of the cowl panel 28, a cowl vibration-damping steel plate 30 with a generally L-shaped configuration as seen in a side view is joined to a lower portion of the front wall 28F and a front portion of the bottom wall 28B by, for example, spot welding. More specifically, the cowl vibration-damping steel plate 30 includes, as essential components, a front wall portion 30F which is joined to the front wall 28F, and a lower wall portion 30L which is joined to the bottom wall 28B.

The dash panel 22 has an upper end portion 22U which is joined to the front wall 28F of the cowl panel 28 in an overlapping relationship in a vehicle length direction. In this embodiment, the upper end portion 22U of the dash panel 22 and a lower portion of the front wall 28F of the cowl panel 28 are joined to each other along the almost entire length thereof in a vehicle width direction via the front wall portion 30F of the cowl vibration-damping steel plate 30 at a junction Jcd. The junction Jcd in this embodiment is formed by integrally joining the front wall portion 30F, the front wall 28F, and the upper end portion 22U, which are overlapped in a vehicle length direction, by spot welding.

Figure 4:
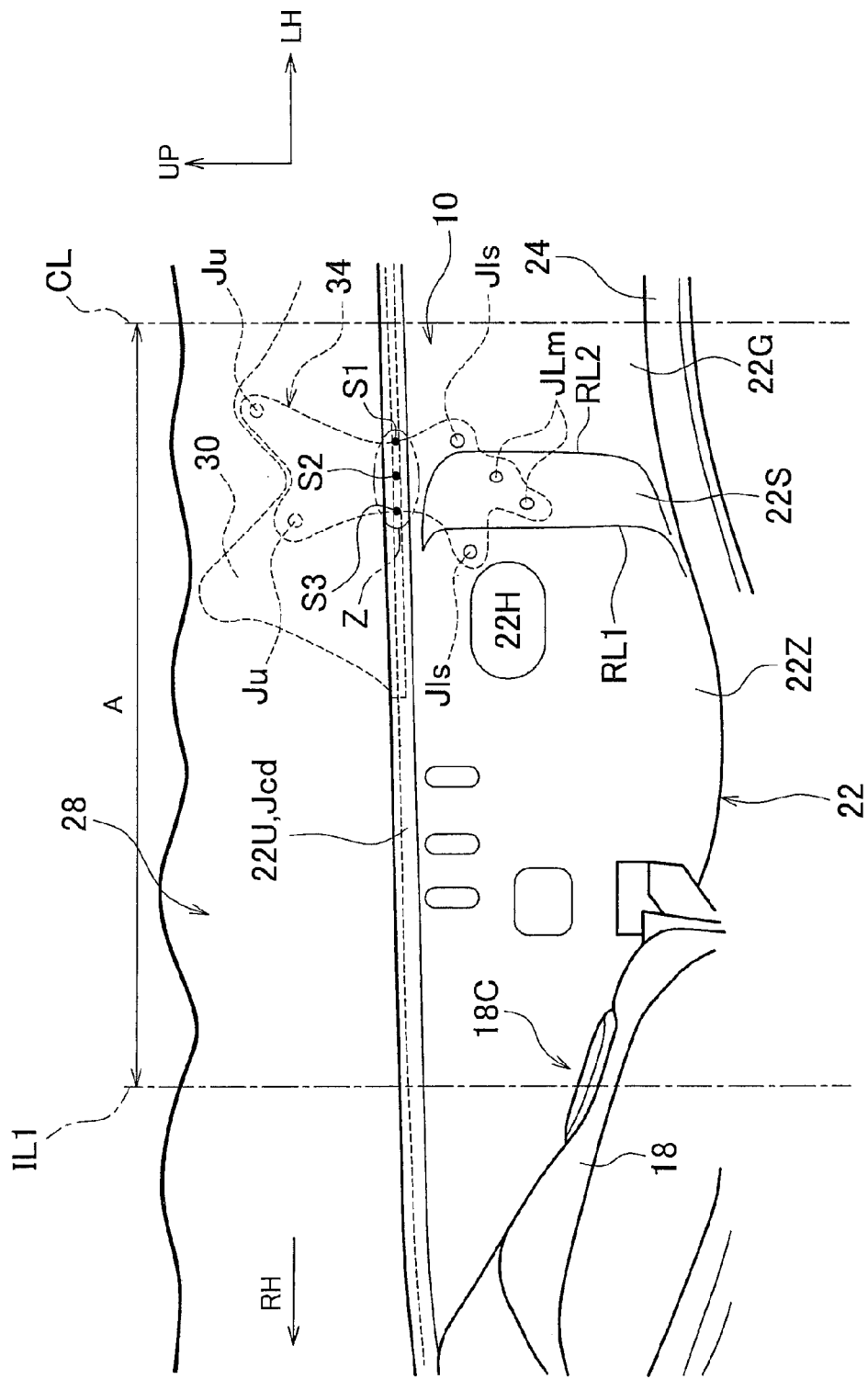
FIG. 4 is a front view that illustrates the front structure for a vehicle according to the embodiment of the present invention.

The dash panel 22, which is joined to the cowl panel 28 at the upper end) portion 22U as described above, is bilaterally asymmetric because of the difference in shape of the cabin C and the engine room E between the driver side and passenger side. As shown in FIG. 4, the dash panel 22 has a stepped portion 22S in a region A between the center line CL in a vehicle width direction as seen in a front view and a spot 18C where the right front suspension tower 18 is coupled to a front suspension (phantom line IL1). In other words, the stepped portion 22S is offset with respect to the center of the vehicle body B in a vehicle width direction. The stepped portion 22S serves as an inclined vertical wall which connects a general portion 22G of the dash panel 22 and a bearing surface portion 22Z that protrudes forward farther than the general portion 22G Thus, a first ridge line RL1 which serves as a boundary with the bearing surface portion 22Z is formed on the right side of the stepped portion 22S, and a second ridge line RL2 which serves as a boundary with the general portion 22G is formed on the left side of the stepped portion 22S. The dash panel 22 is formed by press working, and the first ridge line RL1 and the second ridge line RL2 are one example of a pair of folded portions. In this embodiment, the bearing surface portion 22Z of the dash panel 22 has a through hole 22H that extends through the dash panel 22 at a location close to the stepped portion 22S.

As shown in FIG. 1, the dash panel 22 in this embodiment is covered with a second dash panel 32 from the back side. The second dash panel 32 is joined to the dash panel 22 to reinforce the dash panel 22. Although not shown entirely, the second dash panel 32 is configured to cover the dash panel 22 generally entirely from the back side except an upper part of the stepped portion 22S and a portion around the through hole 22H of the bearing surface portion 22Z.

The vehicle body front structure 10 (the vehicle body B) has a patch 34 as a reinforcing member that couples the dash panel 22 and the cowl panel 28 at a fixed location in the region A as seen in a front view. Specifically, the patch 34 extends between the stepped portion 22S of the dash panel 22 and the bottom wall 28B of the cowl panel 28 as shown in FIG. 1 and FIG. 4. In this embodiment, the patch 34 has a lower flange 34L that forms a lower part thereof and is joined to the stepped portion 22S) of the dash panel 22, and an upper flange 34U that forms an upper part thereof and is joined to a front portion of the bottom wall 28B of the cowl panel 28.

A patch main body 34M of the patch 34 as a main body portion between the lower flange 34L and the upper flange 34U forms a closed cross-sectional portion CS which has a generally triangular shape as seen in a side view in conjunction with the dash panel 22 and the bottom wall 28B of the cowl panel 28 as shown in FIG. 2. In other words, the patch main body 34M is separated from the dash panel 22 and the cowl panel 28. The patch 34 and its joint (coupling) structure are described in more detail below.

Figure 5:
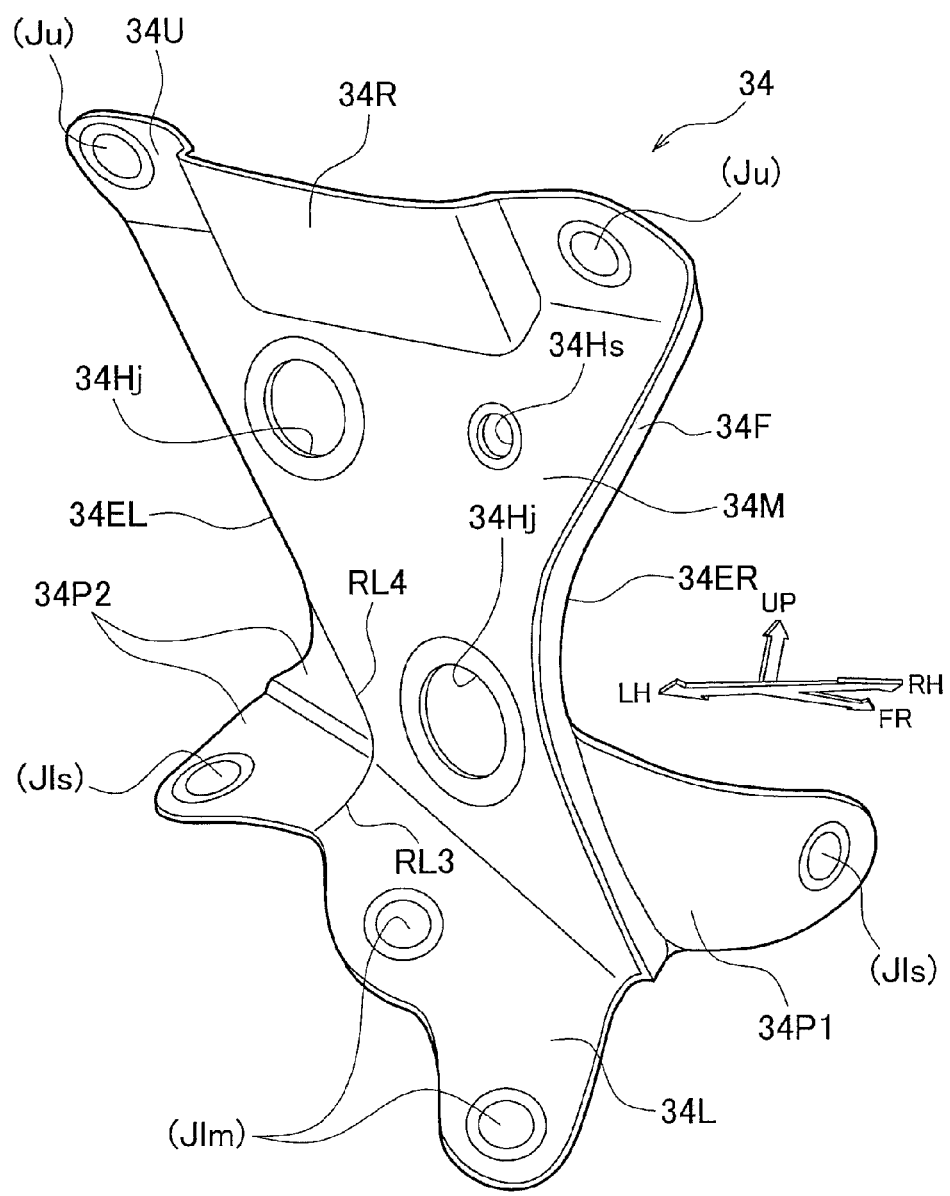
FIG. 5 is a perspective view that illustrates only a patch that constitutes the front structure for a vehicle according to the embodiment of the present invention.

As shown in FIG. 5, the patch main body 34M, which has a plate-like configuration, has a linear left edge 34EL which is slightly inclined with respect to a vehicle height direction, and an arcuate right edge 34ER which is curved to be convex rearward as seen in a side view. A reinforcing flange 34F as a reinforcing wall extends rearward from the curved right edge 34ER of the patch main body 34M. Thus, the right edge 34ER of the patch main body 34M is reinforced in a vehicle height (tensile) direction by the reinforcing flange 34F. The patch main body 34M has an attachment datum hole 34Hs into which a datum pin of a welding apparatus is inserted when the patch 34 is joined to the vehicle body B, and a pair of jig attachment holes 34Hj as a plurality of openings that are used to maintain the attachment position of the patch 34 relative to the vehicle body B.

The upper flange 34U is formed by bending an upper end of the patch main body 34M rearward, and is joined to the bottom wall 28B at two upper junctions Ju that are arranged at right and left ends thereof as shown in FIG. 1. In this embodiment, the patch 34 has a rib 34R, at the center in its width direction, as an upper restricting portion which is formed across the boundary between the upper flange 34U and an upper end portion of the patch main body 34M and protrudes rearward. Thus, the patch 34 is reinforced against deformation which tends to increase the bend angle (tends to eliminate (unfold) the bend) between the patch main body 34M and the upper flange 34U compared to a configuration without the rib 34R. In this embodiment, the reinforcing flange 34F is connected to the right edge 34ER of the upper flange 34U.

The lower flange 34L is formed by bending a lower end of the patch main body 34M rearward, and joined to the stepped portion 22S at two, upper and lower, lower main junctions Jlm as a plurality of main junctions that are shown in FIG. 1. The lower main junctions Jlm are configured to ensure the joint strength between a lower portion of the patch 34 and the dash panel 22.

A pair of extended leg portions 34P1 and 34P2 as leg portions extend laterally in opposite directions from a lower portion of the patch main body 34M of the patch 34, that is, the lower flange 34L. The extended leg portion 34P1, which extends rightward, extends farther rightward than a lower portion of the reinforcing flange 34F and is joined to a back side of the bearing surface portion 22Z of the dash panel 22 at a lower subsidiary junction Jls as a subsidiary junction that is located near its extended end. The extended leg portion 34P2, which extends farther leftward from a lower portion of the patch main body 34M and a left end of the lower flange 34L, is joined to a back side of the general portion 22G of the dash panel 22 at a lower subsidiary junction Jls as a subsidiary junction that is located near its extended end.

In this embodiment, the extended leg portion 34P2 is joined to the dash panel 22 via the second dash panel 32 at the lower subsidiary junction Jls. The right and left lower subsidiary junctions Jls are joined at locations on both sides of the stepped portion 22S (the patch main body 34M) of the dash panel 22 in a vehicle width direction before the lower main junctions Jlm are joined so that the deviation of the coupling location of a lower portion of the patch 34 can be within an acceptable range relative to the dash panel 22.

The extended leg portion 34P2 forms a ridge line (folded portion) RL3 which is convex upward along the boundary with the lower flange 34L, and forms a ridge line (folded portion) RL4 which is convex rearward along the boundary with a lower portion of the patch main body 34M. Thus, the patch 34 is reinforced against deformation which tends to increase the bend angle (to eliminate (unfold) the bend) between the patch main body 34M and the lower flange 34L (and the extended leg portion 34P2) compared to a configuration without the ridge lines RL3 and RL4. The ridge line RL3 along the boundary between the extended leg portion 34P2 and the lower flange 34L and the ridge line RL4 along the boundary between the extended leg portion 34P2 and a lower portion of the patch main body 34M as described above are one example of lower restricting portions.

The junctions where the patch 34 is joined to the dash panel 22 and the cowl panel 28 as described above are formed by spot welding. The joint may be made by means of bolts and nuts instead of welding.

In the vehicle body front structure 10, components CP, such as a dash inner silencer (insulator), an air-conditioning unit (HVAC) and a wire harness, are disposed in a cabin C side space including the location where the patch 34 is joined to the dash panel 22 as shown in FIG. 2. The patch main body 34M of the patch 34 has a curved right edge as described above in order to avoid interference with the components CP (including the range of movement of movable components, such as the wire harness).

(Process of installing patch 34) In the vehicle body front structure 10, the dash panel 22 is assembled to the vehicle body B before the cowl member 26 is assembled to the vehicle body B when the vehicle body B is assembled, and, in this state, the patch 34 is secured to the dash panel 22 at the two lower subsidiary junctions Jls. Next, the patch 34 is secured to the stepped portion 22S of the dash panel 22 at the two lower main junctions Jlm. Then, after the cowl member 26 is assembled to the vehicle body B, the patch 34 is secured to the bottom wall 28B of the cowl panel 28 through the cowl vibration-damping steel plate 30 at the upper junctions Ju in the final assembly step.

During the assembly, the patch 34 is attached to a jig at the two jig attachment holes 34Hj of the patch main body 34M and held in proper position relative to the dash panel 22. For example, the patch 34 is attached to a jig on a hand of an assembling robot at the jig attachment holes 34Hj and transported by the robot to (inserted into) a desired location in the vehicle body B during assembly. When the patch 34 is transported to a desired location relative to the dash panel 22 (the vehicle body B), a welding datum pin is inserted into the attachment datum hole 34Hs, and, in this state, the patch 34 is secured in place at the lower subsidiary junctions Jls as described above.

The effects of the first embodiment are next described.

When an automobile travels on a rough road, for example, a large vertical load is applied to the front suspensions. In particular, in automobiles with a large unsprung mass, such as vehicles which use large diameter tires on the front wheels, or automobiles with a large sprung mass, such as hybrid vehicles which have a heavy battery, a large load tends to be transmitted from the front suspensions to the vehicle body B.

In an automobile to which the vehicle body front structure 10 with the above configuration is applied, when a large downward load is transmitted from a front suspension to the front suspension tower 18 (refer to the arrow Fd in FIG. 3), the front portion 20F of the front side member 20, which is joined to the front suspension tower 18, is forced downward. Thus, a moment M is generated around the junction where a rear end of the front portion 20F is joined to the dash cross member 24, and the dash panel 22 is, pulled forward by the moment M.

Then, the junction Jcd, where the upper end portion 22U of the dash panel 22 and the front wall 28F of the cowl panel 28 are joined in an overlapping relationship in a vehicle length direction by spot welding undergoes deformation (stress) which tends to cause separation thereof. Especially, the deformation (in a vehicle length direction) which tends to cause separation of the junction Jcd tends to be large when the right and left front wheels are moved in vertically opposite phases.

The stepped portion 22S of the dash panel 22, in other words, the portion between the two ridge lines RL1 and RL2, serves as a high-rigidity region. Thus, a load (deformation) toward the front of the vehicle which is caused by the moment M is transmitted to the junction Jcd along a phantom straight line that connects the front side member 20 and the stepped portion 22S. In other words, because the load which is caused by the moment M is less likely to be absorbed (attenuated) by deformation of the panel on the routes along the two ridge lines RL1 and RL2 (the stepped portion 22S) than on a route through any other portion, a larger load is transmitted to the junction Jcd along the ridge lines RL1 and RL2 than along any other portion. In other words, the deformation which tends to cause separation of the junction Jcd is larger at the location where the stepped portion 22S is formed than at any other portion of the dash panel 22 in a vehicle width direction. It was confirmed by computer aided engineering that high stress is applied to a region Z including spot welding points S1 to S3 that are shown in FIG. 4 in a comparative example without the patch 34.

Figure 6A:
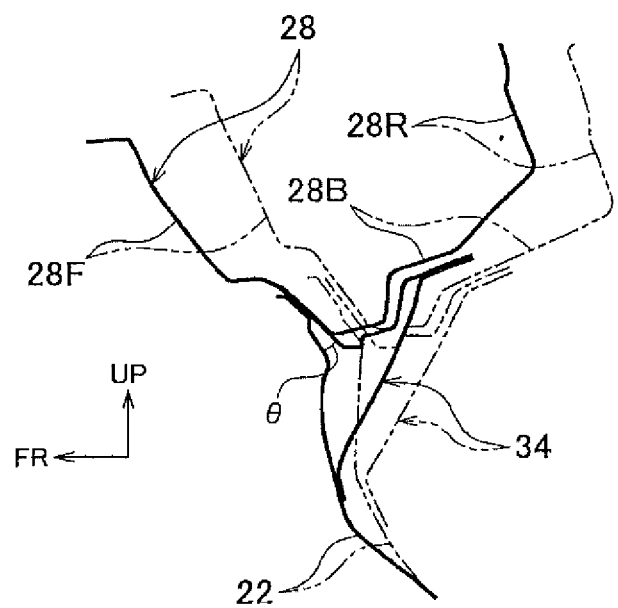
FIG. 6A is a diagrammatic drawing that illustrates the result of a computer aided engineering of the state of the front structure for a vehicle according to the embodiment of the present invention that is deformed by a force from a front wheel.
Figure 6B:
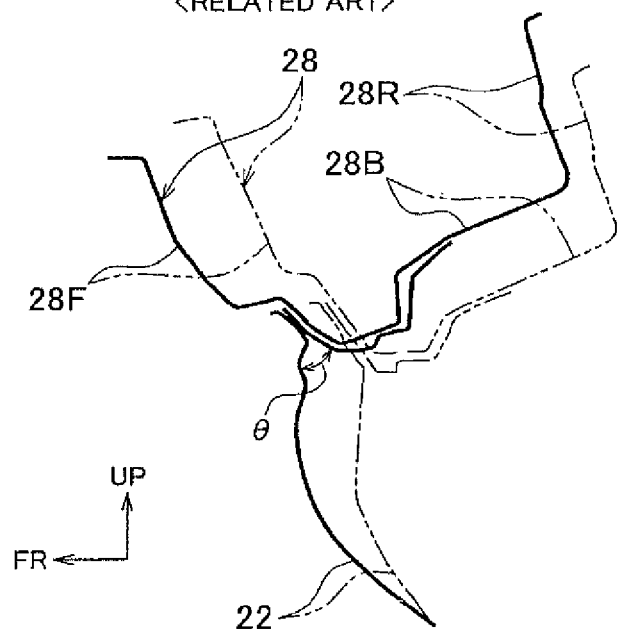
FIG. 6B is a diagrammatic drawing that illustrates the result of a computer aided engineering of the state of a front structure for a vehicle according to a comparative example as a related art that is deformed by a force from a front wheel.

Thus, in a comparative example without the patch 34, the degree of deformation at the junction Jcd which tends to cause separation thereof in a deformed state, which is indicated by solid lines, with respect to the shape before the transmission of the load (deformation), which is indicated by imaginary lines, will be large as shown in FIG. 6B. Specifically, the angle θ that is formed by the dash panel 22 and the front wall 28F, in other words, repetitive load (stress), becomes large. When the thickness of the steel plates that form the dash panel 22 and the cowl panel 28 is increased to obtain a fatigue strength that is sufficiently high to prevent the separation of the spot welding at the junction Jcd (to reduce the stress that is applied to the junction Jcd) as a countermeasure against this problem, the mass of the vehicle body B increases.

In the vehicle body front structure 10, the patch 34 is provided on a portion of the dash panel 22 where the deformation, that is, stress, that tends to cause separation of the junction Jcd will be the largest. Thus, the deformation which tends to cause separation of the dash panel 22 and the front wall 28F is restricted (a load that resists the deformation is supported) by tension of the patch 34 in a generally vehicle height direction. FIG. 6A shows the outline of the result of computer aided engineering that was conducted on this embodiment under the same load conditions as in the comparative example that is shown in FIG. 6B. In this embodiment, as shown in FIG. 6A, the angle θ that is formed by the dash panel 22 and the front wall 28F, that is, the repetitive load (stress), can be smaller in the state after the deformation, which is indicated by solid lines, compared to that in the above comparative example. The imaginary lines in FIG. 6A show the shape of the dash panel 22 and the cowl panel 28 before the transmission of load (deformation) as in the case with the comparative example that is shown in FIG. 6B.

It was confirmed by computer aided engineering (CAE), such as a finite element method (FEM), that the stress that is applied to the spot welding points in the junction Jcd immediately above the stepped portion 22S is reduced in this embodiment. More specifically, an analysis result that the stress that is applied to the spot welding points S1 to S3 immediately above the stepped portion 22S that are shown in FIG. 4 is reduced was obtained.

As described above, in the vehicle body front structure 10 according to this embodiment, the strength (fatigue strength) against separation of the portion where the stepped portion 22S is formed, at which stress is most likely to concentrate in a vehicle width direction, in the junction between the dash panel 22 and the cowl panel 28 can be improved. In addition, the installation of the patch 34 improves the rigidity of the vehicle body B against torsion during a turn or lane change of the automobile V.

Especially, in the vehicle body front structure 10, a portion of the dash panel 22 immediately below the junction Jcd between the front wall 28F of the cowl panel 28 and the upper end portion 22U of the dash panel 22, which are joined in a vehicle length direction, and a portion of the bottom wall 28B close to the front wall 28F are connected by the patch 34. In other words, a structure is formed in which the patch 34, which resists the separation of the junction Jcd between the dash panel 22 and the cowl panel 28 by tension, connects the dash panel 22 and the cowl panel 28 across the junction Jcd. Thus, the patch 34 effectively contributes to the improvement of the strength against the separation of the junction between the dash panel and cowl compared to a comparative example in which an upper end side is joined to the rear wall 28R of the cowl panel 28, for example.

In addition, because the patch 34 with the above configuration connects the dash panel 22 and the cowl panel 28 in a short distance, the angle θ that is formed by the dash panel 22 and the front wall 28F, that is, repetitive load (stress), can be kept small by the patch 34, which is compact in size. Thus, the increase in mass of the vehicle body B can be significantly suppressed compared to a comparative example in which the thickness of the dash panel 22 and the cowl panel 28 is increased to improve their fatigue strength to an equivalent level. It has been confirmed from a result of computer aided engineering that the increase in weight by the addition of the patch has an advantage in terms of mass compared to a comparative example in which an equivalent fatigue strength is achieved by increasing the panel thickness.

Especially, the rib 34R improves the strength of the patch 34 against deformation which tends to unfold (eliminate) the bend of the upper flange 34U relative to the patch main body 34M. In addition, the ridge lines RL3 and RL4 improve the strength of the patch 34 against deformation which tends to unfold (eliminate) the bend of the lower flange 34L relative to the patch main body 34M. In other words, the patch 34 is formed to have high rigidity against tension along a phantom straight line IL2 that connects an upper junction Ju and a lower main junction Jlm (refer to FIG. 2), and is highly effective in improving the fatigue strength though it is compact in size. In addition, the fact that the deformation restricting portions of the upper and lower flanges 34U and 34L are formed separately is effective in reinforcing the bends and the patch main body 34M and contributes to a reduction in size of the patch 34.

In addition, especially in the vehicle body front structure 10, one edge (the right edge) of the patch main body 34M in a vehicle width direction is curved to prevent interference with other parts. Because the reinforcing flange 34F is erected along the patch main body 34M, the reinforcing flange 34F ensures that the patch main body 34M has sufficient strength against tension. In other words, the patch main body 34M is provided with sufficient strength against tension to contribute to the fatigue strength of the junction Jcd as described above. Because the reinforcing flange 34F continues to the right edge of the upper flange 34U, it also contributes to the improvement of the strength of the upper flange 34U against bend which tends to unfold the bend of the upper flange 34U relative to the patch main body 34M in conjunction with the rib 34R, which is described above.

In the vehicle body front structure 10, the stepped portion 22S has a plurality of (two) lower main junctions Jlm. Thus, the stress on each lower main junction Jlm can be reduced compared to the case where the stepped portion 22S has only one lower main junction Jlm. In other words, because the load that is transmitted from a wheel to the junction between the dash panel 22 and the patch 34 is distributed to the plurality of lower main junctions Jlm, the stress on each lower main junction Jlm is reduced.

Similarly, the upper flange 34U of the patch 34 is secured to the cowl panel 28 at a plurality of upper junctions Ju. Thus, the load that is transmitted from a wheel to the junction between the cowl panel 28 and the patch 34 is distributed to the plurality of upper junctions Ju, and the stress on each upper junction Ju is reduced. Especially, in this embodiment, the upper junctions Ju are located in the region in which the lower wall portion 30L of the cowl vibration-damping steel plate 30 is provided. This further reduces the stress which is applied to each upper junction Ju in conjunction with the effectiveness of the cowl vibration-damping steel plate 30 in reinforcing the cowl panel 28.

In addition, in the vehicle body front structure 10, the patch 34 is secured in place on the dash panel 22 at the two lower subsidiary junctions Jls which are located on both sides of the stepped portion 22S in a vehicle width direction, before the patch 34 is secured to the dash panel 22 at the lower main junctions Jlm (in order to ensure strength). Thus, the lower flange 34L of the patch 34 can be secured in place without deviation (within an allowable range) relative to the stepped portion 22S as an inclined face of the dash panel 22. Thus, the patch 34, when properly secured to the dash panel 22 at the two lower main junctions Jlm, contributes to the improvement of the fatigue strength of the junction Jcd between the dash panel 22 and the cowl panel 28 as described above.

In addition, the two lower subsidiary junctions Jls are located on the extended leg portions 34P1 and 34P2 as leg portions that extend from the patch main body 34M in opposite directions along a vehicle width direction. Thus, in the vehicle body front structure 10, the patch 34 can be secured in place on the dash panel 22 at both side of the stepped portion 22S of the dash panel 22 in a vehicle width direction without increasing the size of the patch 34 in a vehicle width direction.

In addition, because the patch main body 34M has two jig attachment holes 34Hj, the patch 34 is maintained in an appropriate position by a jig when transmitted to its installation location on the dash panel 22.

While an example in which the patch 34 is installed in the region A between the center of the vehicle body B in a vehicle width direction and the right (passenger side) front suspension tower 18 is shown in the above embodiment, the present invention is not limited thereto. The patch 34 may be provided at any location in a vehicle width direction where the stress which is applied to the junction Jcd in a vehicle width direction would be high without the patch 34. Thus, the patch 34 may be installed at the center in a vehicle width direction or on the driver side with respect to the center in a vehicle width direction.

In addition, the (shape of the) reinforcing member in the present invention is, not limited to the (shape of the) the patch 34. For example, the reinforcing member may be of any shape depending on the shape of the dash panel 22 that is used in the automobile V and the shape and dimensions of components that are located behind the dash panel 22.

In addition, while an example in which the stepped portion 22S as an inclined vertical wall is formed between a pair of folded portions of the dash panel 22 is shown in the above embodiment, the present invention is not limited thereto. For example, a bearing surface portion which is formed by protruding or retracting, in a vehicle length direction, a part of the dash panel 22 in a vehicle width direction and is generally parallel to the general portion may be the portion between folded portions that are formed on both sides thereof in a vehicle width direction.

In addition, while an example in which the vehicle body B is provided with the cowl vibration-damping steel plate 30 and the second dash panel 32 is shown in the above embodiment, the present invention is not limited thereto. For example, at least one of the cowl vibration-damping steel plate 30 and the second dash panel 32 may not be provided.

It should be appreciated that that the present invention can be implemented with various modifications without departing from the gist thereof.

What is claimed is:

1. A front structure for a vehicle, comprising:
   a cowl panel having at least a front wall and a bottom wall, the bottom wall extending from a lower end of the front wall toward a rear of the vehicle, and the cowl panel opening toward a top of the vehicle;
   a dash panel having an upper end portion joined to the front wall of the cowl panel in an overlapping relationship in a vehicle length direction; and
   a reinforcing member having a lower end side and an upper end side, the lower end side being joined to the dash panel at a junction, the upper end side being joined to the bottom wall of the cowl panel, to provide a closed cross-section in conjunction with the dash panel and the bottom wall,
   wherein the dash panel has a pair of folded portions provided apart from each other in a vehicle width direction, and the junction between the lower end side of the reinforcing member and the dash panel includes a plurality of main junctions that are located between the pair of folded portions of the dash panel;
   wherein the junction between the lower end side of the reinforcing member and the dash panel includes at least two subsidiary junctions, the pair of folded portions of the dash panel being sandwiched between the subsidiary junctions in a vehicle width direction;
   wherein the front wall of the cowl panel and the dash panel are joined along a vehicle width direction;
   wherein the upper end side of the reinforcing member is joined to the cowl panel, at at least two portions located at different positions along the vehicle width direction; and wherein the reinforcing member has a main body portion, the main body portion providing a closed cross-section in conjunction with the dash panel and the bottom wall of the cowl panel in a vehicle width direction.

2. The front structure for a vehicle according to claim 1, wherein the subsidiary junctions are provided on a pair of leg portions, the pair of leg portions extending from a lower end side of the reinforcing member in opposite directions along a vehicle width direction.

3. The front structure for a vehicle according to claim 1, wherein the upper end side of the reinforcing member is joined to the bottom wall of the cowl panel at a plurality of points.

4. The front structure for a vehicle according claim 1, wherein the main body portion has a first edge, a second end side and a reinforcing wall, the first edge linearly extending along a first end side of the main body portion in a vehicle width direction between the dash panel and the bottom wall, the second edge extending in an arcuate configuration as seen in a side view along a second end side of the main body portion in a vehicle width direction between the dash panel and the bottom wall, and the reinforcing wall protruding in a vehicle length direction from the second edge.

5. The front structure for a vehicle according to claim 1, wherein the reinforcing member further includes a lower flange, an upper flange, a lower restricting portion and an upper restricting portion, the lower flange being bent at a lower end of the main body portion and extending along a back side of the dash panel and is joined to the dash panel; the upper flange being bent at an upper end of the main body portion, extending along a lower face of the bottom wall and being joined to the bottom wall; the lower restricting portion restricting deformation which tends to increase a bend angle between the main body portion and the lower flange; and the upper restricting portion restricting deformation which tends to increase a bend angle between the main body portion and the upper flange.

6. The front structure for a vehicle according to claim 1, wherein the main body portion of the reinforcing member has a plurality of openings, the main body portion providing a closed cross-section in conjunction with the dash panel and the cowl panel.

* * * * *